J. W. MOORE.
Runner Attachment for Carriages.
No. 98,990.
Patented Jan. 18, 1870.
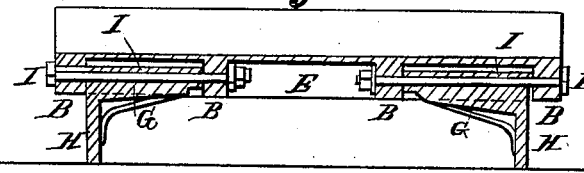
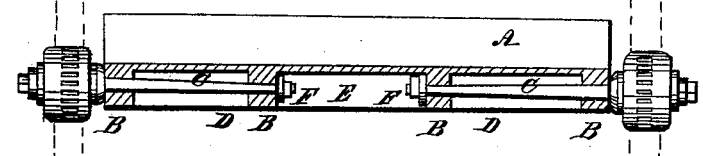
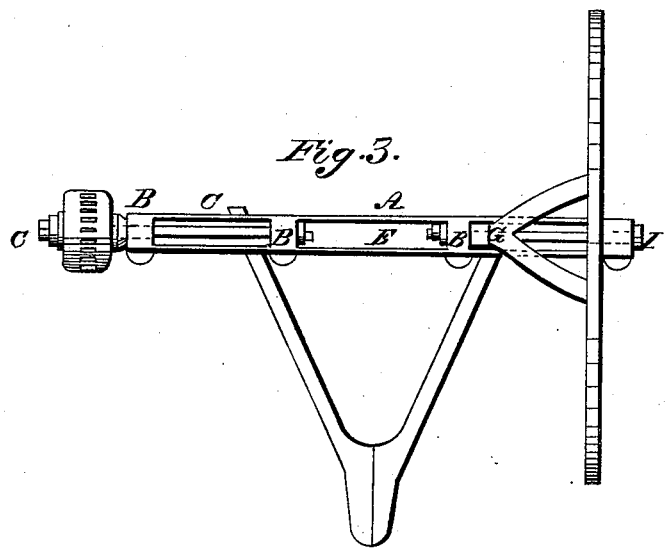

United States Patent Office.

J. W. MOORE, OF WATSEKA, ILLINOIS.

Letters Patent No. 98,990, dated January 18, 1870.

IMPROVED RUNNER-ATTACHMENT FOR CARRIAGES.

The Schedule referred to in these Letters Patent and making part of the same.

*To all whom it may concern:*

Be it known that I, J. W. MOORE, of Watseka, in the county of Iroquois, and State of Illinois, have invented a new and improved Runner-Attachment for Wagons; and I do hereby declare that the following is a full, clear, and exact description thereof, which will enable others skilled in the art to make and use the same, reference being had to the accompanying drawings, forming part of this specification.

This invention relates to improvements in the application of runner-attachments to wagons, and consists in the employment of axle-supporting beams, in substitution of the common axles, adapted for the support of short independent axles for the wheels, or bolts for connecting the bob-runners, so that the wheels or runners may be applied at any time, as required, the said beams being the length of the distance between the wheels, and provided with two bearings for each axle, one at each end, and the other near the centre; and recesses are formed between the bearings, for the reception of sleeves or hollow knees on the bob-runners, by which they are connected to the beams, by bolts, taking the places of the short axles of the wheels.

Figure 1 is a section through one of the beams, showing the application of the runners;

Figure 2 is a similar section, showing the application of the wheels; and

Figure 3 is a plan of the bottom, when the wheels are applied.

Similar letters of reference indicate corresponding parts.

The beams A, which I substitute for the common axle, between the wheels, have bearings, B, at the under side, adapted for the reception of short axles, C, for the wheels, to which I propose to connect the wheels rigidly, and have the said axles turn.

Between these bearings are recesses D E, the one, E, is provided to facilitate the application and removal of the nuts F, or other fastenings for the inner ends of the axles, and the others are for the reception of the knees G of the bob or other runners, which are applied when the wheels are removed, and secured by bolts I, which take the place of the axles of the wheels.

This is a very simple and durable construction and arrangement, by which the change from one condition to the other can be readily made; and the permanent attachment of the hubs of the wheels to the short axle has advantages; for instance, the hubs may be made shorter, whereby they project less, which is desirable.

Having thus described my invention,

I claim as new, and desire to secure by Letters Patent—

The mode of attaching the runner, substantially as shown and described, and for the purpose specified.

J. W. MOORE.

Witnesses:
SAMUEL FISHER,
THOS. J. NORTON.